No. 695,338. Patented Mar. 11, 1902.
G. J. PAYNTER & F. C. WATSON.
COMBINED LIGHT AND MIRROR.
(Application filed Aug. 7, 1901.)
(No Model.)
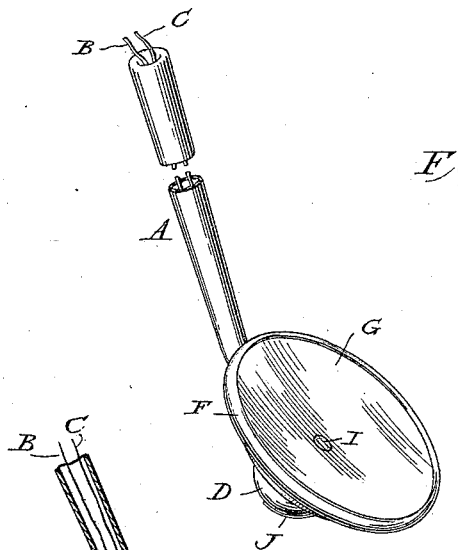
Fig. 1.
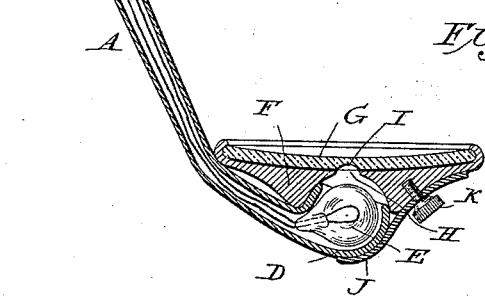
Fig. 2.
Fig. 3.
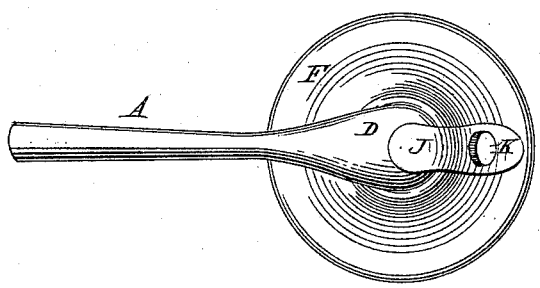
Witnesses
Inventors:
by George J. Paynter and Frank C. Watson,
Dodge and Sons
Attorneys
THE NORRIS PETERS CO., PHOTO-LITHO., WASHINGTON, D. C.

United States Patent Office.

GEORGE J. PAYNTER AND FRANK C. WATSON, OF PHILADELPHIA, PENNSYLVANIA, ASSIGNORS TO SMITH-WATSON MANUFACTURING COMPANY, OF PHILADELPHIA, PENNSYLVANIA, A CORPORATION OF DELAWARE.

COMBINED LIGHT AND MIRROR.

SPECIFICATION forming part of Letters Patent No. 695,338, dated March 11, 1902.

Application filed August 7, 1901. Serial No. 71,238. (No model.)

*To all whom it may concern:*

Be it known that we, GEORGE J. PAYNTER and FRANK C. WATSON, citizens of the United States, residing at Philadelphia, in the county of Philadelphia and State of Pennsylvania, have invented certain new and useful Improvements in a Combined Light and Mirror, of which the following is a specification.

Our present invention pertains to an improved combination of an electric light and mirror, the construction and advantages of which will be hereinafter fully set forth, reference being had to the annexed drawings, wherein—

Figure 1 is a perspective view of the improved device; Fig. 2, a sectional view of the same, and Fig. 3 a bottom plan view.

The object of the invention is to provide a superior mirror for the use of dentists and surgeons, in which the angular position of the mirror with reference to its handle may be varied and also in which the light-rays may be concentrated and directed on any particular point or may be dispersed, as desired.

Previous to our invention mouth-mirrors have been constructed wherein the light or electric lamp has been placed in rear of the reflecting-surface, and the light was permitted to pass out around the edge of the mirror. It has also been proposed to have the lamp located to one side of the mirror. The present invention is clearly distinguishable from both of these, as will appear from the following description.

In the drawings, A denotes the handle of the device, made hollow and forming a conduit for the lamp-wires B C. The lower end of the handle is enlarged, forming a rounded head D, open at one side, the electric lamp E being seated therein and protected thereby. A body F, preferably disk-shaped and formed of any suitable material, forms the support for the mirror or reflecting-surface G. Body F is formed on its under face with a socket or recess, into which fits the head D of the handle. An opening H is formed centrally of the body or, in other words, is simply an extension of the socket through the body. The mirror is formed with a lens I at its center, said lens being made by suitably grinding the surface of the mirror, or, if desired, the lens may be separately manufactured and secured in a central opening in the mirror. The lens of course is not silvered, so that the light-rays may pass therethrough, being concentrated or dispersed, according to the nature of the lens employed. As will be noted, the lamp is in direct alinement with the lens, so that the light-rays are direct and not reflected ones. If desired, the lens may be omitted, the mirror having a central blank portion through which the light-rays may pass.

To maintain the mirror and its supporting-body in proper relation to the handle, an arm or finger J is secured to the body by a screw K, the free end of the arm passing beneath and bearing directly on the outer face of the head D. This construction permits adjustment of the mirror with reference to the handle, while still maintaining the parts in place. It also affords a ready means whereby access may be had to the lamp for any cause whatsoever.

Having thus described our invention, what we claim is—

1. In an instrument of the character described, the combination of a suitable support; an electric light carried by one end thereof; and a reflecting-surface secured to said support in front of and over the light, said surface having a central space or opening formed therein for the passage of the light-rays therethrough, whereby the image of an illuminated object may be directly viewed in the reflecting-surface, substantially as described.

2. In an instrument of the character described, the combination of a suitable support; an electric light carried at one end thereof; a reflecting-surface adjustably secured to said support in front of and over the light, said surface having a central space formed therein for the passage of light therethrough.

3. In an instrument of the character described, the combination of a suitable support; an electric light carried at the outer end thereof; a reflecting-surface secured to the support in front of and over the light; and a lens located in the reflecting-surface in line with the light, whereby the image of the illuminated object may be directly viewed in the reflecting-surface.

4. In an instrument of the character described, the combination of a suitable support; an electric light carried at the outer end thereof; a reflecting-surface adjustably secured to said support; and a lens located centrally of the reflecting-surface in line with the light.

5. In an instrument of the character described, the combination of a suitable support; an electric light carried thereby; a reflector secured to said support in front of and over the light, said reflector having a space or opening formed therein in direct alinement with said light, whereby the light-rays may pass directly through said opening and the image of the object thus illuminated may be directly viewed in the reflector.

6. In an instrument of the character described, the combination of a handle having an enlarged rounded head with an opening formed therein; an electric lamp seated within said head; a body-section provided with a socket for said head; and a mirror carried by said body, said mirror having a central space for the passage of light-rays therethrough, substantially as described.

7. In an instrument of the character described, the combination of a handle having a rounded head with an opening formed therein; an electric lamp seated within said head; a body-section provided with a socket for the reception of the head; a mirror carried by said body, said mirror having a central space for the passage of light-rays therethrough; and an arm secured to the body and extending beneath the head.

8. In an instrument of the character described, the combination of a handle having a rounded head with an opening formed therein; an electric lamp seated within said head; a body-section provided with a socket for the reception of the head; a mirror carried by said body; a lens located centrally of the mirror and in line with the opening in the head; and means for adjustably securing the head and body-section together.

In testimony whereof we have signed our names to this specification in the presence of two subscribing witnesses.

GEORGE J. PAYNTER.
FRANK C. WATSON.

Witnesses:
  THEO. H. MCCALLA,
  JOS. H. COFRODE.